(Model.)
F. L. KOLLBERG.
BOILER FLUE EXPANDER AND CUTTER.
No. 301,130.  Patented July 1, 1884.
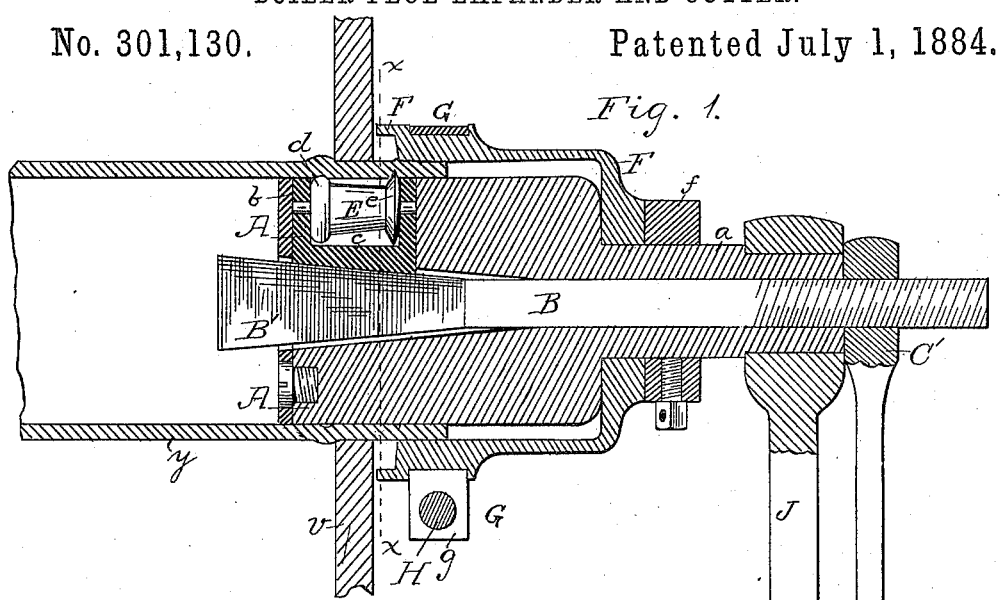
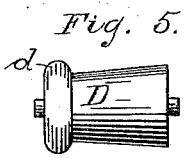
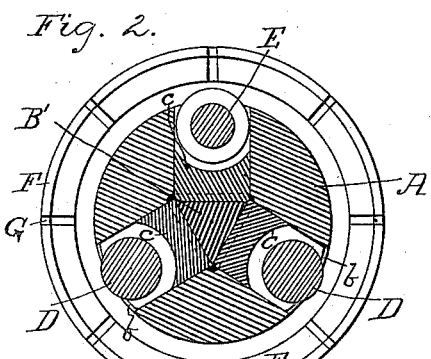
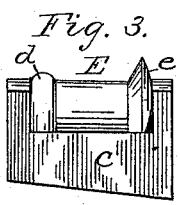
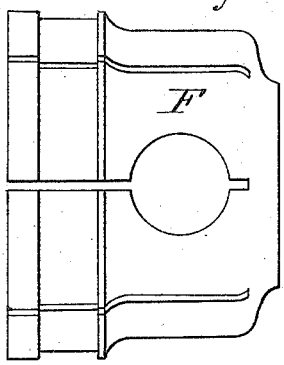
WITNESSES:
E. W. Schirach
S. S. Schoff
Fredrick L. Kollberg.
INVENTOR
BY James H. Coyne.
ATTORNEY

UNITED STATES PATENT OFFICE.

FREDRICK L. KOLLBERG, OF CHICAGO, ILLINOIS, ASSIGNOR OF ONE-HALF TO JOSEPH BEE, OF SAME PLACE.

BOILER-FLUE EXPANDER AND CUTTER.

SPECIFICATION forming part of Letters Patent No. 301,130, dated July 1, 1884.

Application filed March 7, 1884. (Model.)

*To all whom it may concern:*

Be it known that I, FREDRICK L. KOLLBERG, of Chicago, in the county of Cook and State of Illinois, have invented certain new and useful Improvements in Boiler-Flue Expanders and Cutters; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to accomplish with one tool both the operation of cutting and the operation of expanding steam-boiler flues at the same time. This I am enabled to do by combined rollers and cutters and means for operating them, and a bell-shaped spring-clamp for securing the tool to the exposed end of the flue.

Figure 1 is a vertical longitudinal section of my improved tool. Fig. 2 is a vertical transverse section taken on line $x\,x$, Fig. 1; and Figs. 3, 4, and 5 are detail views thereof.

Reference being had to the drawings, A represents a cylindrical head having a tang or sleeve, $a$, extending longitudinally from its outer end, the bore of which is concentric to bore of the head, which latter is triangular in cross-section. The triangular dimensions of the bore of the head are greater at the mouth thereof, from whence to the bore of the said sleeve $a$ it gradually diminishes, its contours forming the reverse of a truncated trigonal pyramid.

Passing longitudinally through the bores of the head A and sleeve $a$ is a screw, B, that part within the bore of the sleeve being cylindrical, and having its outer end screw-threaded, and that part, B', within the bore of the head of a shape corresponding to the contours of said bore. On the end of the screw outside of the sleeve $a$ is a nut, C', having a suitable handle, whereby said screw is moved in or out, as will be hereinafter more fully explained.

In the head A, near its inner end, are three rectangular radial openings, $b\,b\,b$, leading at right angles to the sides of the bore of the head to the circumference of the same. In these openings $b$ are the removable bearings $c\,c\,c$ of the rotary expanding-dies and the rotary cutter E, having their inner surfaces inclined longitudinally, so as to correspond to the sides of the part B' of the screw B, so that as the nut C is manipulated and the screw B drawn outward thereby the bearings $c\,c\,c$, in which the expanding-dies and rotary cutter are journaled, will be forced outward.

The expansion-dies D have a cylindrical body and a circumferential bead, $d$, around the same.

The rotary cutter consists of a cylindrical body, a circumferential bead around its inner edge, similar to the expanding-dies, and a circumferential knife-edge, $e$, around that edge opposite to the bead.

Journaled on the sleeve $a$ immediately next the head A, in which position it is secured by a collar, $f$, is a bell-shaped spring, F, the barrel of which is slit longitudinally, as shown in Fig. 4, and incloses the head A. Near its outer edges it is provided with an annular depression, in which is a ring, G, its ends turned outward to form lugs $g\,g$, which are tapped to receive the right-and-left screw H.

In operation my improved expander and cutter works as follows: The head A is pushed into the flue until the edges of the bell-shaped spring bear against the head $v$ of the boiler, the edges of the flue passing between the circumference of head A and spring F. The spring F is then clamped onto the projecting end of the flue by tightening the ring G by means of the right-and-left screw H. A ratchet or other handle is then slipped over the outer end of the sleeve $a$, which is adapted to accommodate the same, and the head is revolved. At the same time the nut C is manipulated to draw the screw outward, thus forcing the bearings $c\,c\,c$ and the expanding-dies and the rotary cutter journaled therein outward to perform their functions—namely, to expand the tube on the inside of the boiler-head, and to cut the projecting end of the flue off to a suitable length, so that it may afterward be conveniently flanged outward in the proper manner. When the expanders and cutters have performed their functions, the screw H is manipulated to loosen the clamp-spring F, so that the cut-off part of the flue can be removed and the tool made ready for another operation. The removable bearings of the expanding-dies and the cutter render it possible, by loosening the collar $f$ and slipping the bell-shaped spring back from over the openings $b\ b$, to insert bearings having larger dies, if desired.

If desired, the part B′ of the screw B may be made conical, and the engaging surfaces of the bearings $c\ c$ made to correspond; but I prefer the triangular shape, as that prevents the said screw from revolving independently when the nut C is being manipulated.

What I claim as new, and desire to secure by Letters Patent, is—

1. The combination, with the revolving head A, the expanding-dies and rotary cutter, and suitable bearings in which said dies and cutter are journaled, of the screw B, having a tapered or trigonal pyramidal part, B′, and the nut C, for drawing said screw outward and bringing the part B′ in contact with the bearings of the dies and cutter to force them radially outward.

2. The combination of the bell-shaped spring, the band G, and screw H, with the head A, having therein the rotary cutter and expanding-dies, and means for operating the same.

In testimony that I claim the foregoing as my own I hereunto affix my signature in presence of two witnesses.

FREDRICK L. KOLLBERG.

Witnesses:
E. W. SCHIRACH,
FRANK D. THOMASON.